(12) United States Patent
Arasu

(10) Patent No.: US 9,296,346 B2
(45) Date of Patent: Mar. 29, 2016

(54) VEHICLE-MOUNTED CABLE AND VEHICLE

(75) Inventor: Michiaki Arasu, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 312 days.

(21) Appl. No.: 13/976,644

(22) PCT Filed: Feb. 3, 2011

(86) PCT No.: PCT/JP2011/052246
§ 371 (c)(1),
(2), (4) Date: Jun. 27, 2013

(87) PCT Pub. No.: WO2012/105023
PCT Pub. Date: Aug. 9, 2012

(65) Prior Publication Data
US 2013/0307325 A1 Nov. 21, 2013

(51) Int. Cl.
*B60L 1/00* (2006.01)
*B60R 16/02* (2006.01)
(Continued)

(52) U.S. Cl.
CPC ............... *B60R 16/02* (2013.01); *B60L 11/123* (2013.01); *B60L 11/14* (2013.01); *B60L 11/1818* (2013.01); *B60L 11/1825* (2013.01); *B60L 11/1877* (2013.01); *B65H 63/04* (2013.01); *B65H 75/42* (2013.01); *H01R 13/633* (2013.01); *H01R 13/72* (2013.01); *H02G 11/02* (2013.01); *B60L 2210/10* (2013.01); *B60L 2210/30* (2013.01); *B60L 2210/40* (2013.01); *B60L 2220/14* (2013.01); *B60L 2230/12* (2013.01); *B65H 2701/34* (2013.01); *H01R 2105/00* (2013.01); *Y02T 10/6217* (2013.01); *Y02T 10/705* (2013.01); *Y02T 10/7005* (2013.01); *Y02T 10/7077* (2013.01); *Y02T 10/7088* (2013.01); *Y02T 10/7216* (2013.01); *Y02T 10/7241* (2013.01); *Y02T 90/121* (2013.01); *Y02T 90/127* (2013.01); *Y02T 90/128* (2013.01); *Y02T 90/14* (2013.01)

(58) Field of Classification Search
CPC .............. B60L 11/123; B60L 2210/30; B60L 2230/12; B60L 2220/14; B65H 2701/34; B65H 63/04; B65H 75/42; H01R 13/633; H01R 2105/00; H02G 11/02; Y02T 10/6217; Y02T 90/121; B60R 16/02
USPC ......................................................... 307/9.1
See application file for complete search history.

(56) References Cited

U.S. PATENT DOCUMENTS

| 2003/0207611 | A1 | 11/2003 | Lin et al. |
| 2010/0013236 | A1* | 1/2010 | Carroll ............................ 290/55 |
| 2012/0193929 | A1* | 8/2012 | Karner ........................ 294/174 |

FOREIGN PATENT DOCUMENTS

| CN | 201143884 Y | 11/2008 |
| JP | A-5-328532 | 12/1993 |
| JP | A-5-328619 | 12/1993 |
| JP | A-8-236206 | 9/1996 |

(Continued)

*Primary Examiner* — Jared Fureman
*Assistant Examiner* — Duc M Pham
(74) *Attorney, Agent, or Firm* — Oliff PLC

(57) ABSTRACT

A vehicle-mounted cable mounted in a vehicle provided with a cable port includes: a first cable that can be pulled out through the cable port; a second cable connected to the vehicle; and a connection device that connects the first cable and the second cable together, and disconnects the first cable and the second cable when the connection device experiences tension equal to or larger than prescribed tension, the connection device being provided at a position allowing the connection device to be pulled out through the cable port.

7 Claims, 10 Drawing Sheets

(51) Int. Cl.
*B60L 11/12* (2006.01)
*B60L 11/14* (2006.01)
*B60L 11/18* (2006.01)
*H01R 13/633* (2006.01)
*H01R 13/72* (2006.01)
*H02G 11/02* (2006.01)
*B65H 63/04* (2006.01)
*B65H 75/42* (2006.01)
*H01R 105/00* (2006.01)

(56) References Cited

FOREIGN PATENT DOCUMENTS

| JP | A-11-299008 | 10/1999 |
| JP | U-3097567 | 1/2004 |
| JP | A-2007-228716 | 9/2007 |
| JP | A-2008-136346 | 6/2008 |
| JP | A-2009-112076 | 5/2009 |
| JP | A-2010-158136 | 7/2010 |

\* cited by examiner

VEHICLE-MOUNTED CABLE AND VEHICLE

TECHNICAL FIELD

The present invention relates to a vehicle-mounted cable and a vehicle, and more specifically to a vehicle-mounted cable pulled out outside a vehicle and a vehicle having that vehicle-mounted cable mounted therein.

BACKGROUND ART

Conventionally, there have been proposed a variety of cables mounted in vehicles and vehicles having such cables mounted therein.

For example, Japanese Patent Laying-Open No. 11-299008 (PTD 1) describes an electric vehicle including a battery, a charging cable connected to the battery and disposed in a storage room, a vehicular connector provided at an end of the charging cable, and a cylinder provided to penetrate a wall of the storage room and having the vehicular connector detachably connected thereto. When a commercial power supply is used to charge the battery, the vehicular connector is detached from the cylinder and the vehicular connector is connected to the commercial power supply.

Furthermore, in the field of cables, a variety of configurations have been proposed for minimizing/preventing excessive load exerted to cables.

For example, Japanese Patent Laying-Open No. 2008-136346 (PTD 2) describes a charging system including a branch line branched from a trunk line, a hooking connector connected to a device, an intermediate cable having one end connected to the hooking connector, and an intermediate joint connected to the branch line and the intermediate cable. The intermediate joint includes a flat-blade connector provided at the branch line and a flat-blade plug connected to the intermediate cable.

Japanese Patent Laying-Open No. 2010-158136 (PTD 3) describes a cabling structure including an electric conduction cable that couples between a charging device and an electric vehicle, and a load detection cable. The load detection cable is provided with a re-couplable separation unit that is provided between a portion coupled with the charging device and the other, coupled end of the load detection cable and is separated when a prescribed load is applied.

Japanese Patent Laying-Open No. 5-328532 (PTD 4) describes a suspended charger including a safety joint that is provided at an intermediate portion of a cable having an end provided with a connector and is separated by tension.

Japanese Patent Laying-Open No. 8-236206 (PTD 5) describes a device to select allowing/disallowing a connector to be disconnected, that includes a male connector secured to a device and a female connector that has a cable connected thereto and is provided with the male connector detachably.

Japanese Utility Model Registration No. 3097567 (PTD 6) describes a USB cable including a mechanism to reel up a cable.

CITATION LIST

Patent Documents

PTD 1: Japanese Patent Laying-Open No. 11-299008
PTD 2: Japanese Patent Laying-Open No. 2008-136346
PTD 3: Japanese Patent Laying-Open No. 2010-158136
PTD 4: Japanese Patent Laying-Open No. 5-328532
PTD 5: Japanese Patent Laying-Open No. 8-236206
PTD 6: Japanese Utility Model Registration No. 3097567

SUMMARY OF INVENTION

Technical Problem

When the charging cable and electric vehicle described in Japanese Patent Laying-Open No. 11-299008 for example have the vehicular connector connected to a commercial power supply, and the charging cable is caught by an object, the charging cable may experience significant tension depending on how the charging cable is pulled. In that case, there is a possibility that the vehicular connector and/or the cylinder may be damaged.

The charging system described in Japanese Patent Laying-Open No. 2008-136346 is provided outside a vehicle, rather than mounted therein, and so is the cabling structure described in Japanese Patent Laying-Open No. 2010-158136. Similarly, the suspended charger described in Japanese Patent Laying-Open No. 5-328532 is not mounted in a vehicle, nor is the cable reel up mechanism described in Utility Model Registration No. 3097567.

When a cable mounted in a vehicle and having one end connected the vehicle experiences significant tension, the above patent documents do not provide a solution to prevent the vehicle and the cable from having their mutually connected portions damaged.

The present invention has been made in view of the above issue, and an object of the present invention is to provide a vehicle-mounted cable mounted in a vehicle and pulled out through a port formed in the vehicle, that can minimize/prevent damage to an end of a cable connected to the vehicle, and a vehicle including that vehicle-mounted cable.

Solution to Problem

According to the present invention, a vehicle-mounted cable is mounted in a vehicle provided with a cable port. The vehicle-mounted cable includes: a first cable that can be pulled out through the cable port; a second cable connected to the vehicle; and a connection device that connects the first cable and the second cable together, and disconnects the first cable and the second cable when the connection device experiences tension equal to or larger than prescribed tension. The connection device is provided at a position allowing the connection device to be pulled out through the cable port.

Preferably, when the connection device is pulled out through the cable port, an end of the second cable connected to the vehicle is tensioned.

Preferably, the connection device includes a first connection member associated with the first cable and a second connection member associated with the second cable and capable of engaging with the first connection member. The second connection member includes a receiving portion provided to cover at least a portion of the first connection member. When tension equal to or larger than prescribed tension is exerted between the first connection member and the second connection member, the receiving portion deforms to be open so as to disconnect the first connection member and the second connection member. The cable port has an opening having an edge that catches the receiving portion in an open position and prevents the receiving portion in the open position from entering the vehicle past the cable port.

Preferably, the receiving portion includes a base, a first piece provided at the base and attached to an external circumferential surface of the first connection member, a second piece provided at the base and movable away from the first piece, a biasing member biasing the first piece and the second piece to cause the first piece and the second piece to straddle wide therebetween, and an engagement portion engaging the first piece and the second piece together. The engagement portion disengages when the first connection member and the second connection member experience tension equal to or larger than prescribed tension.

Preferably, the first connection member includes a spherical portion, and the first piece and the second piece are formed to have a surface curved to cover the spherical portion. Preferably, the base is provided with a terminal, and the first piece is secured to the base.

According to the present invention, a vehicle includes: the above vehicle-mounted cable, a battery, and a switching element provided between the battery and the vehicle-mounted cable, the switching element disconnecting the battery and the vehicle-mounted cable when the first cable and the second cable are disconnected.

Advantageous Effect of Invention

The present vehicle-mounted cable and vehicle including that vehicle-mounted cable can minimize/prevent excessive tension otherwise exerted to those portions of the vehicle-mounted cable and vehicle that are connected together.

DESCRIPTION OF EMBODIMENTS

Reference will now be made to FIG. 1 to FIG. 14 to describe a vehicle-mounted cable and a vehicle including that vehicle-mounted cable according to an embodiment. Note that while the following embodiment will be described for an example with the present cable and vehicle applied to a so called hybrid vehicle, it is also applicable to an electric vehicle.

First Embodiment

Figure 1:
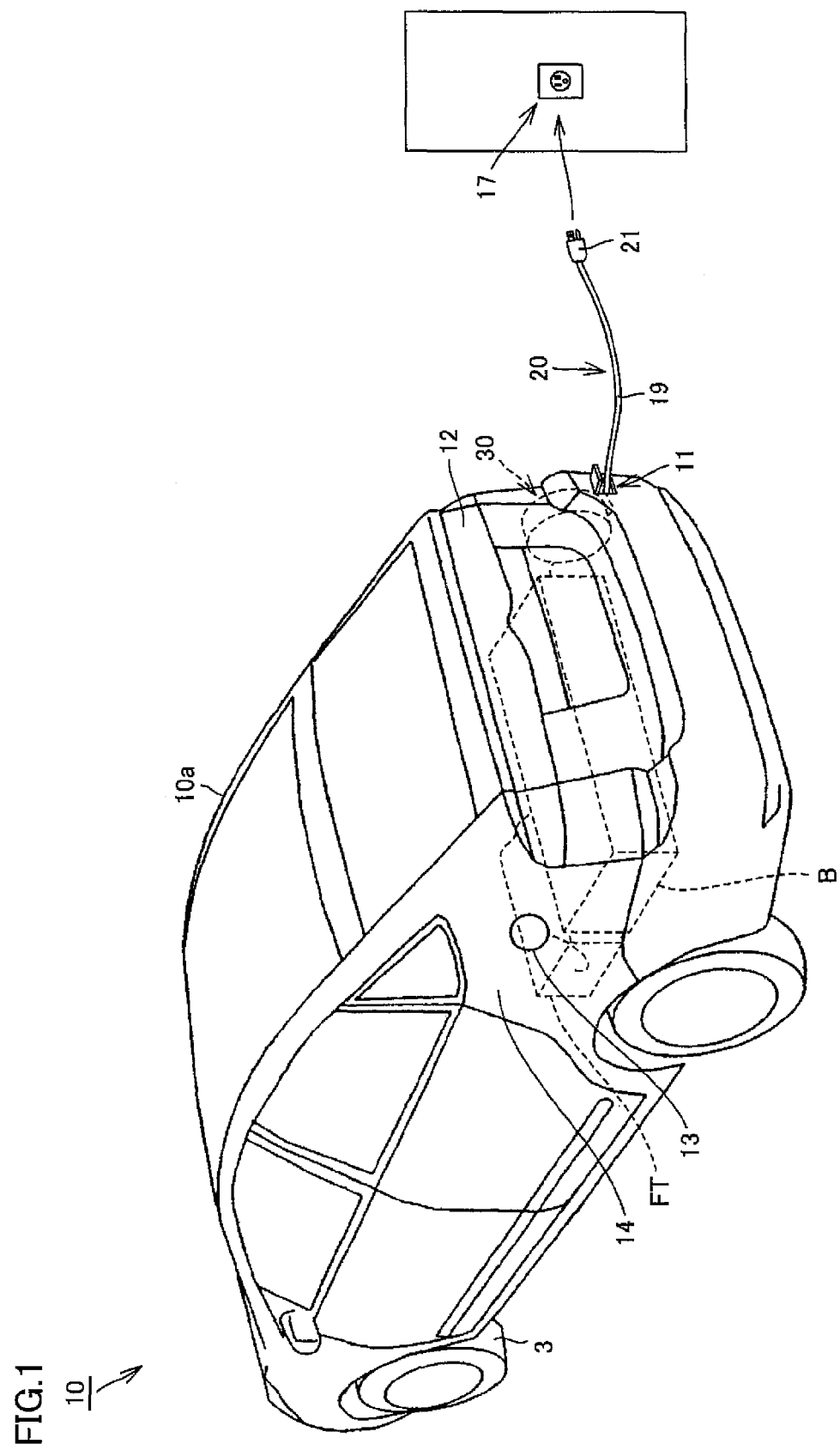
FIG. 1 is a rearward perspective view of a vehicle according to a first embodiment.

FIG. 1 is a rearward perspective view of a vehicle according to the present, first embodiment. As shown in this FIG. 1, vehicle 10 includes a body 10a serving as a shell of the vehicle, a battery B and a fuel tank FT mounted in vehicle 10, and a cable accommodation device 30 mounted in vehicle 10 and having a vehicle-mounted cable 20 wound thereon.

Body 10a includes a back side 12 having a cable port 11 allowing vehicle-mounted cable 20 to be pulled out therethrough and a lateral side 14 having a fuel port 13.

Battery B is a power storage that can store power therein and is connected to cable accommodation device 30 via a converter or the like as will be described hereinafter. Battery B can be a nickel metal hydride battery, a lithium ion battery, a lead battery or a similar rechargeable battery, for example. Furthermore, battery B may be replaced with an electric double layer capacitor of large capacity.

Fuel tank FT receives fuel such as gasoline and light oil fed through fuel port 13 and stores the fuel therein. Fuel tank FT is disposed in vehicle 10 closer to the front side than battery B.

Cable accommodation device 30 is disposed near back side 12. Vehicle-mounted cable 20 includes an electric conduction cable 19 accommodated in cable accommodation device 30 and a plug 21 provided at a distal end of electric conduction cable 19. Plug 21 is connectable to a power supply 17 external to vehicle 10. Plug 21 can be connected to power supply 17 to charge battery B with power received from power supply 17. Note that power supply 17 is a household power supply, a commercial power supply provided in a charging station or similar charging facilities, or the like.

Figure 2:
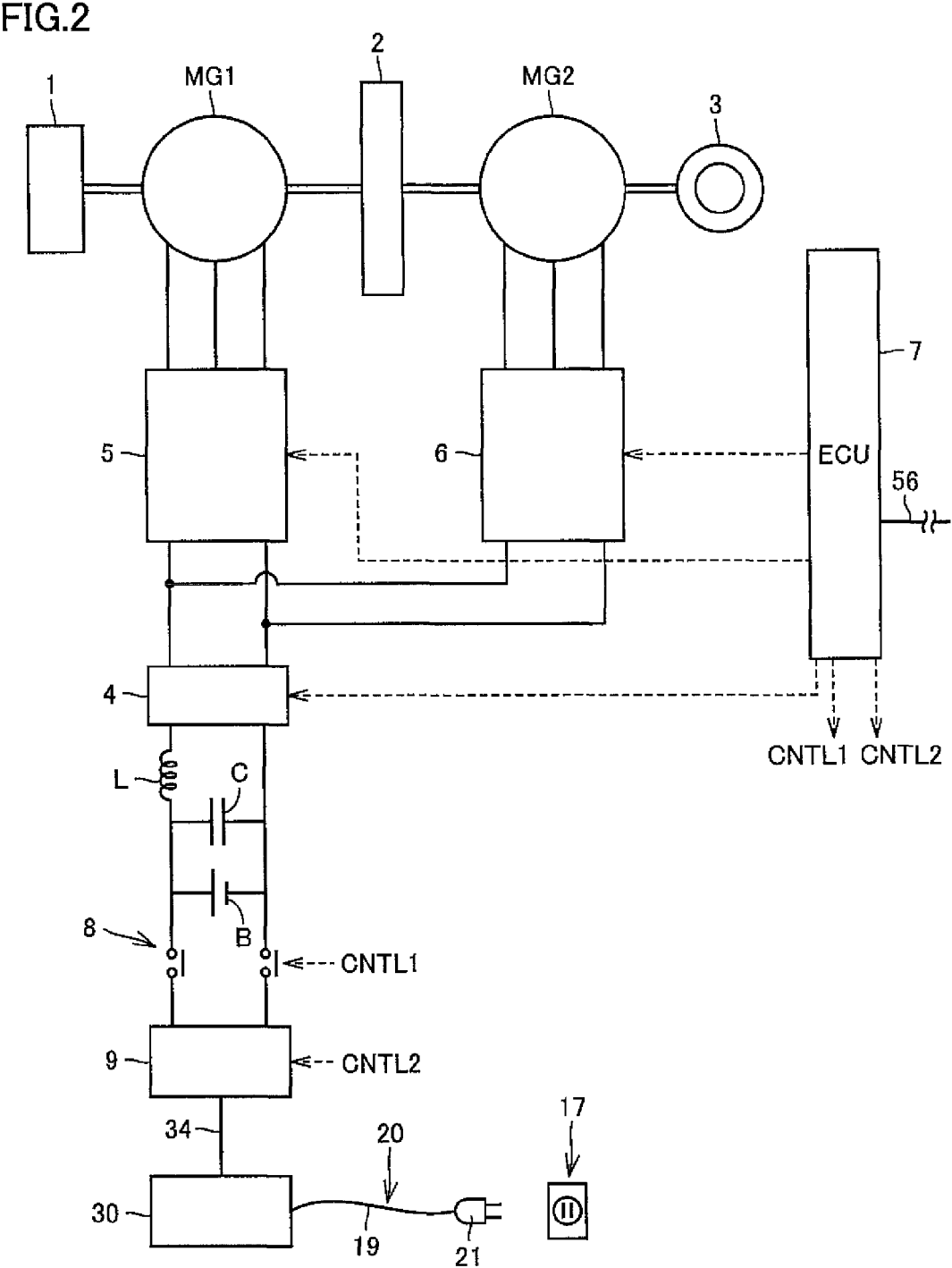
FIG. 2 is a block diagram showing a vehicle 10.

Electric conduction cable 19 is specifically configured as will be described hereinafter. FIG. 2 is a block diagram showing vehicle 10. Vehicle 10 includes an engine 1, motor generators MG1 and MG2, a power split device 2, battery B, a capacitor C, a reactor L, a converter 4, inverters 5 and 6, a vehicular electronic control unit (vehicular ECU) 7, a switching element 8, and a converter 9.

Power split device 2 is coupled with engine 1 and motor generators MG1 and MG2 and distributes power therebetween. For example, power split device 2 is a planetary gear mechanism having three axes of rotation, i.e., a sun gear, a planetary carrier and a ring gear. These three axes of rotation are connected to engine 1 and motor generators MG1 and MG2 at their respective axes of rotation. For example, engine 1 and motor generators MG1 and MG2 can mechanically be connected to power split device 2 by making a rotor of motor generator MG1 hollow and passing a crankshaft of engine 1 through a center thereof.

Note that motor generator MG2 has its axis of rotation coupled with a driving wheel, or a front wheel 3, by a reduction gear, a differential gear or the like (not shown). Power split device 2 may have a speed reducer further incorporated therein for the axis of rotation of motor generator MG2.

Motor generator MG1 is incorporated in vehicle 10 as operating as a power generator driven by engine 1 and as an electric motor that can start engine 1. Motor generator MG2 is incorporated in vehicle 10 as an electric motor that drives the driving wheel or front wheel 3 of vehicle 10.

Motor generator MG1, MG2 is a three-phase alternating synchronous motor, for example. Motor generator MG1, MG2 includes a three-phase coil formed of a U phase coil, a V phase coil, and a W phase coil as a stator coil.

Motor generator MG1 uses the engine's output to generate three-phase alternating voltage, and outputs the generated three-phase alternating voltage to inverter 5. Motor generator MG1 receives three-phase alternating voltage from inverter 6 and thereby generates driving force to start engine 1.

Motor generator MG2 receives three-phase alternating voltage from inverter 6 and thereby generates a torque to drive the vehicle. When the vehicle is regeneratively braked, motor generator MG2 generates and outputs three-phase alternating voltage to inverter 6.

Switching element 8 and converter 9 are disposed between battery B and cable accommodation device 30. Converter 9 is connected to cable accommodation device 30, and switching element 8 is disposed between battery B and converter 9.

Switching element 8 connects and disconnects converter 9 and battery B. Switching element 8 is switched on and off by a control signal CNTL1 issued by vehicular ECU 7.

Converter 9 receives an alternating current from power supply 17, converts the alternating current into a direct current, and supplies the direct current to battery B. Furthermore, in returning the power that is stored in battery B to power supply 17, converter 9 receives a direct current from battery B, converts the direct current into an alternating current, and supplies the alternating current to cable accommodation device 30. Converter 9 is driven in response to a control signal CNTL2 issued by vehicular ECU 7.

In charging battery B, vehicular ECU 7 turns on switching element 8 to connect battery B and converter 9. Then, vehicular ECU 7 drives converter 9 to convert the alternating current power that is supplied from power supply 17 into direct current power.

Figure 3:
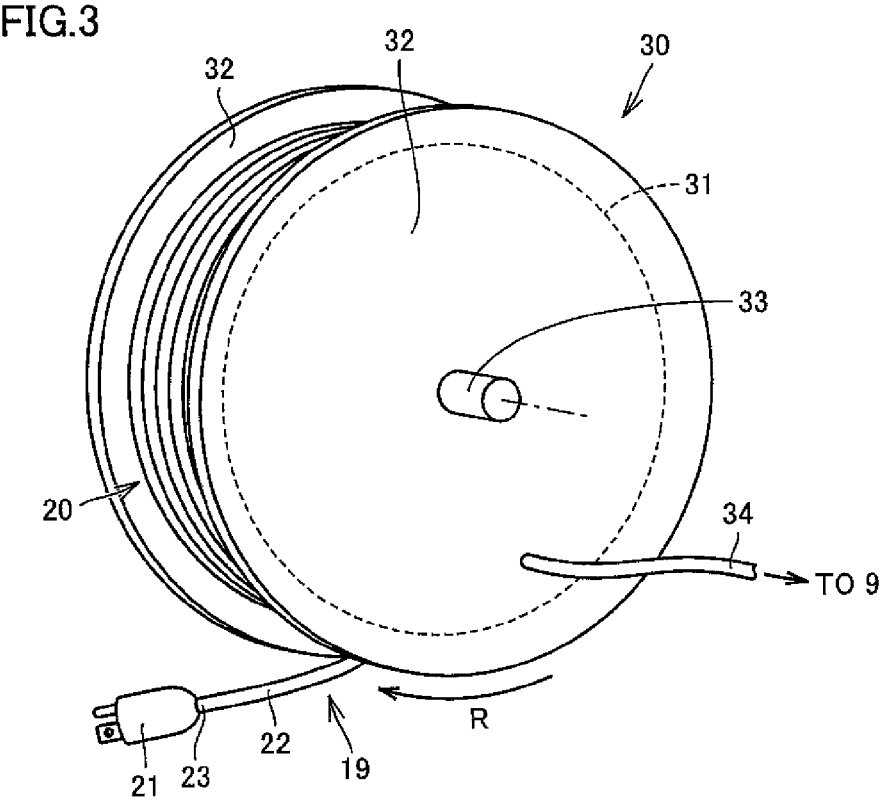
FIG. 3 is a perspective view of a cable accommodation device 30.
Figure 4:
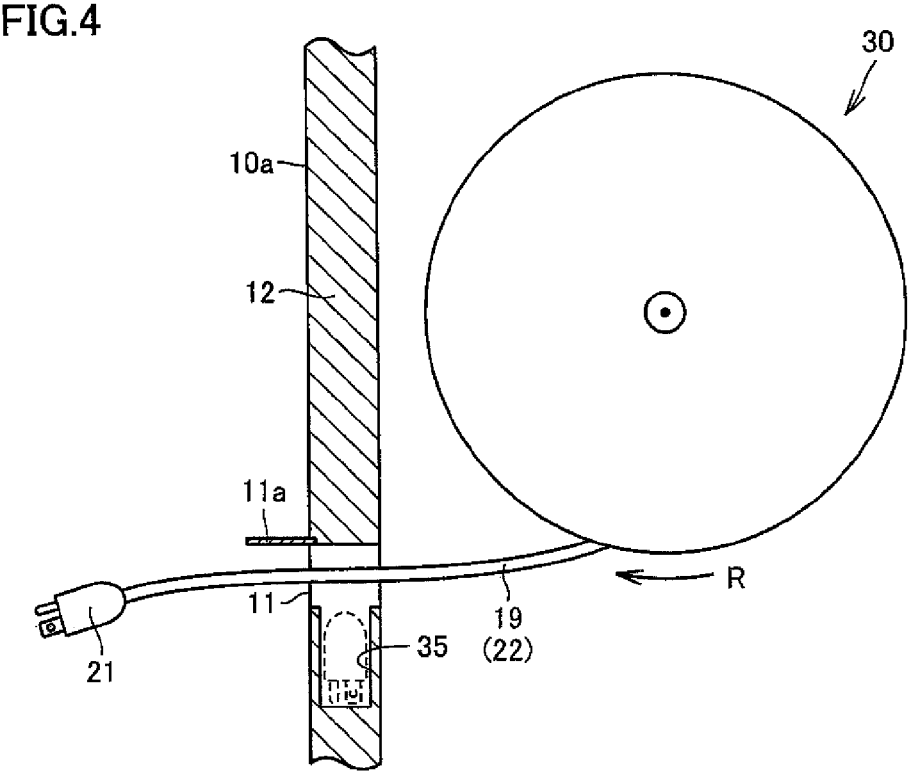
FIG. 4 is a side view schematically showing a relative positional relationship between cable accommodation device 30 and a back side 12.

FIG. 3 is a perspective view of cable accommodation device 30 and FIG. 4 is a side view schematically showing a relative positional relationship between cable accommodation device 30 and back side 12. As shown in FIG. 3, cable accommodation device 30 includes a cylindrical bobbin 31 having a circumferential surface with vehicle-mounted cable 20 wound thereon, a support plate 32 provided to bobbin 31 at opposite ends and supporting vehicle-mounted cable 20, a rotating shaft 33 rotatably supporting bobbin 31, a power line 34, and a connection mechanism electrically connecting power line 34 and vehicle-mounted cable 20.

Rotating shaft 33 is rotatably supported by body 10a for example. Vehicle-mounted cable 20 is fed as bobbin 31 rotates in a direction of rotation R shown in the figure, and vehicle-mounted cable 20 is reeled up by bobbin 31 as bobbin 31 rotates in a direction opposite to direction of rotation R. Power line 34 connects an end portion of vehicle-mounted cable 20 and converter 9.

The connection mechanism is provided in bobbin 31, and includes a rotor that rotates as bobbin 31 rotates and that has the end portion of vehicle-mounted cable 20 connected thereto, a stator that is positionally fixed and thus does not rotate, and a terminal electrically connecting the stator and the rotor.

The rotor has the end portion of vehicle-mounted cable 20 connected thereto, and vehicle-mounted cable 20 is connected to power line 34 via the rotor, the terminal and the stator. Note that power line 34 is connected to converter 9.

As shown in FIG. 4, body 10a has, at back side 12, a lid 11a to open and close cable port 11 and a plug housing portion 35 to house plug 21 therein. When the user charges battery B, the user can open lid 11a and pull out plug 21 that is housed in plug housing portion 35 through cable port 11.

When the user pulls plug 21 or electric conduction cable 19, bobbin 31 rotates in direction of rotation R and electric conduction cable 19 is thus successively fed through cable port 11.

Figure 5:
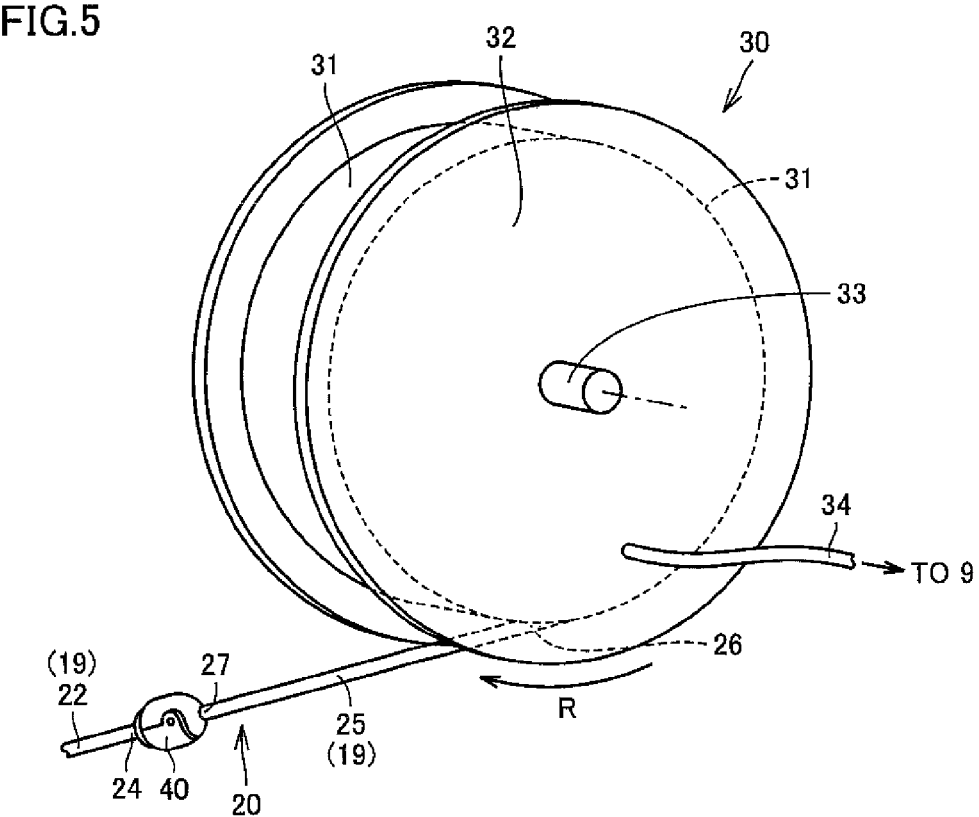
FIG. 5 is a perspective view of cable accommodation device 30 with a vehicle-mounted cable 20 fully pulled out.

FIG. 5 is a perspective view of cable accommodation device 30 with vehicle-mounted cable 20 fully pulled out.

Figure 6:
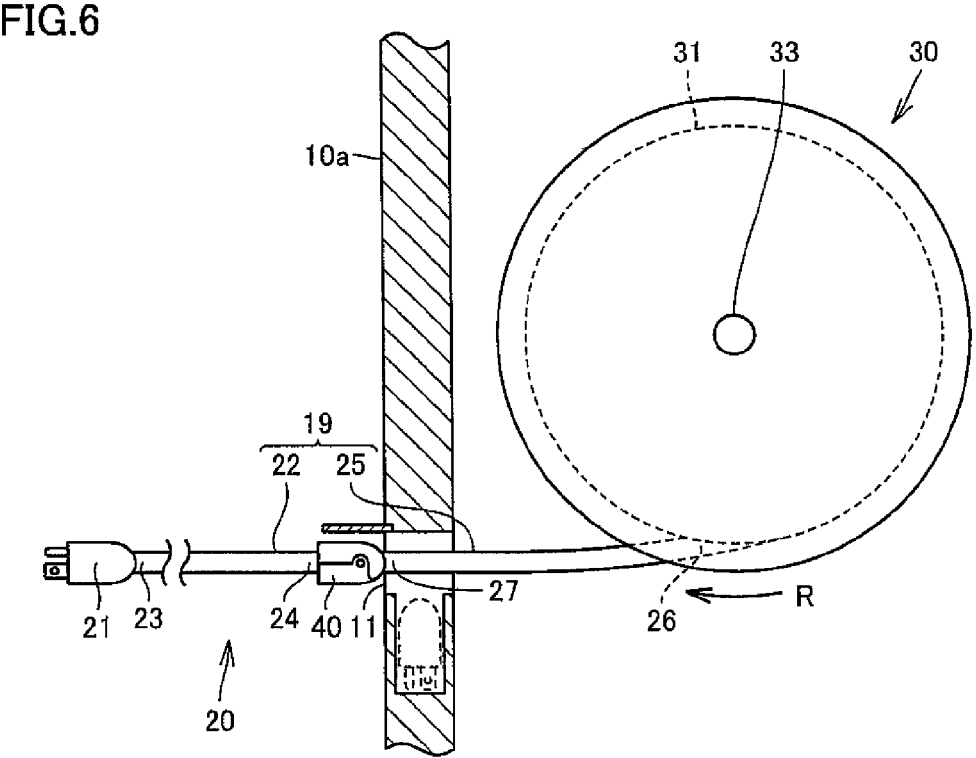
FIG. 6 is a side view showing a relative positional relationship between cable accommodation device 30 and a body 10a, with vehicle-mounted cable 20 fully pulled out as shown in FIG. 5.

FIG. 6 is a side view showing a relative positional relationship between cable accommodation device 30 and body 10a, with vehicle-mounted cable 20 fully pulled out as shown in FIG. 5.

As shown in FIG. 5 and FIG. 6, vehicle-mounted cable 20 includes plug 21, a first cable 22 having a distal end 23 provided with plug 21, a second cable 25 having a proximal end 26 connected to cable accommodation device 30, and a connection device 40 connecting a proximal end 24 of first cable 22 and a distal end 27 of second cable 25 together.

Connection device 40 disconnects first cable 22 and second cable 25 when connection device 40 experiences tension equal to or larger than prescribed tension. Connection device 40 is provided at a position allowing connection device 40 to be pulled out through cable port 11. In the present embodiment when vehicle-mounted cable 20 is fully pulled out, connection device 40 is exposed outside the vehicle past cable port 11.

When vehicle-mounted cable 20 is fully pulled out, second cable 25 is tensioned and second cable 25 experiences tension at proximal end 26.

When vehicle-mounted cable 20 is fully pulled out, and first cable 22 is caught by an object, vehicle-mounted cable 20 experiences large tension. When vehicle-mounted cable 20 experiences excessively large tension, connection device 40 disconnects first cable 22 and second cable 25 to minimize/prevent excessively large load otherwise exerted to those portions of second cable 25 and cable accommodation device 30 that are connected together. This protects those portions of second cable 25 and cable accommodation device 30 in vehicle 10 that are connected together.

On the other hand, connection device 40 is exposed outside vehicle 10, and can thus be easily repaired.

Figure 7:
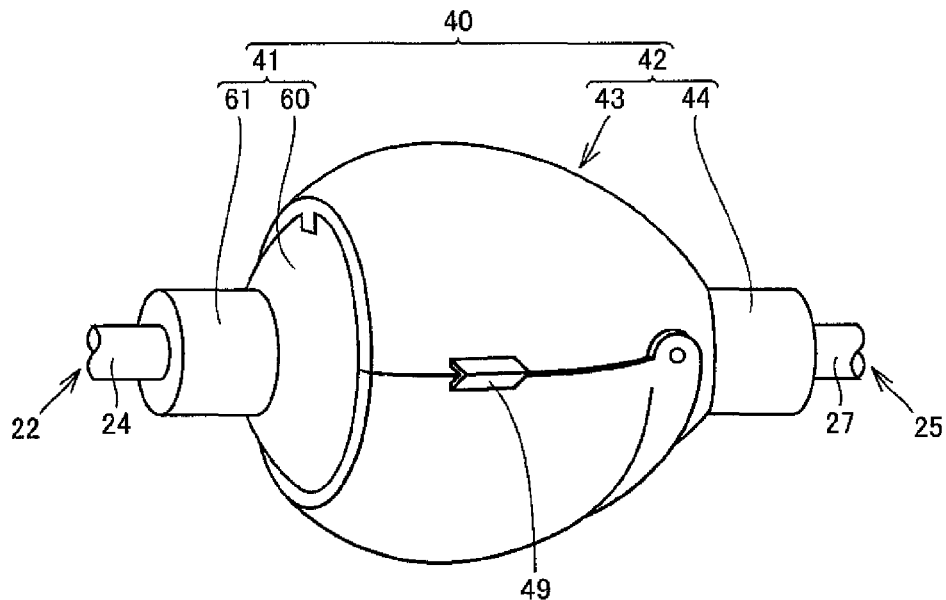
FIG. 7 is a perspective view of a connection device 40 with a first cable 22 and a second cable 25 connected together.

FIG. 7 is a perspective view of connection device 40 with first cable 22 and second cable 25 connected together. As shown in FIG. 7, connection device 40 includes a first connection member 41 provided at proximal end 24 of first cable 22 and a second connection member 42 provided at distal end 27 of second cable 25.

Figure 8:
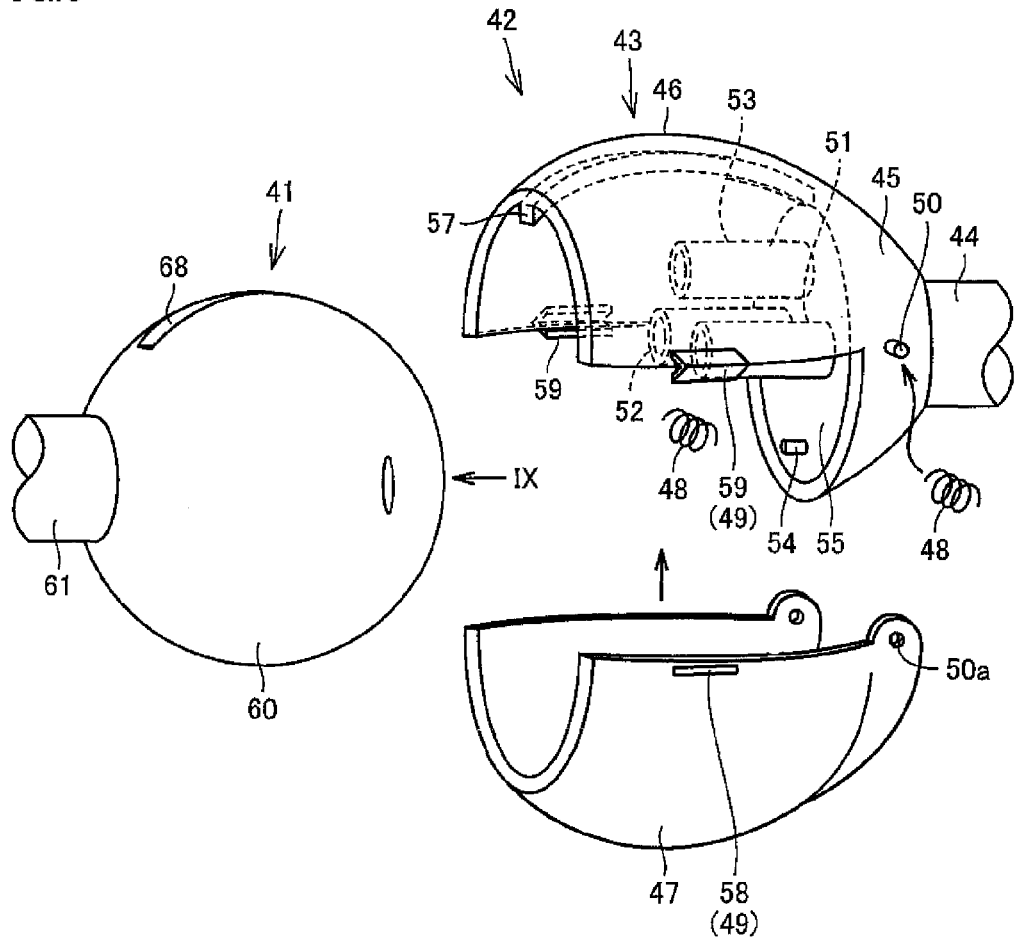
FIG. 8 is an exploded perspective view of connection device 40.

First connection member 41 includes a spherical portion 60 and a cylindrical portion 61 having a proximal end connected to spherical portion 60. Cylindrical portion 61 has a distal end connected to proximal end 24 of first cable 22. FIG. 8 is an exploded perspective view of connection device 40 and FIG. 9 is a front view of spherical portion 60 as seen a direction IX shown in FIG. 8.

Figure 9:
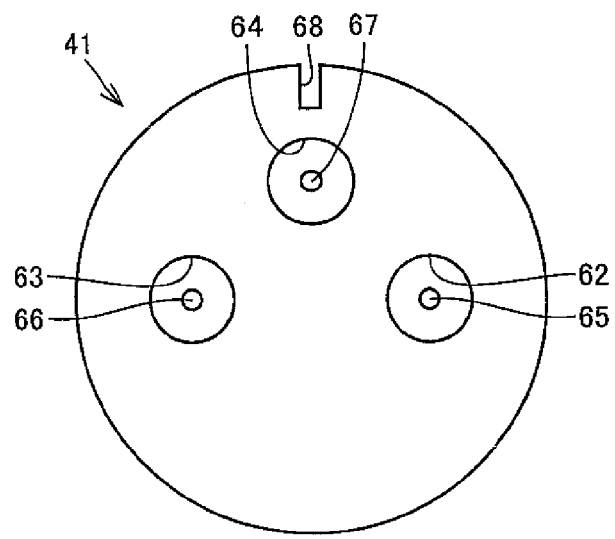
FIG. 9 is a front view of a spherical portion 60 as seen a direction IX shown in FIG. 8.

As shown in FIG. 8 and FIG. 9, spherical portion 60 is formed generally spherically. Of spherical portion 60, a portion having cylindrical portion 61 connected thereto is a distal end and a portion opposite to cylindrical portion 61 is a proximal end for the sake of illustration.

As shown in FIG. 9, spherical portion 60 has a portion closer to the proximal end provided with a plurality of holes 62, 63, 64 provided with terminals 65, 66, 67, respectively.

Note that terminals 65 and 66 are power terminals and terminal 67 is for example a signaling or grounding terminal.

Figure 10:
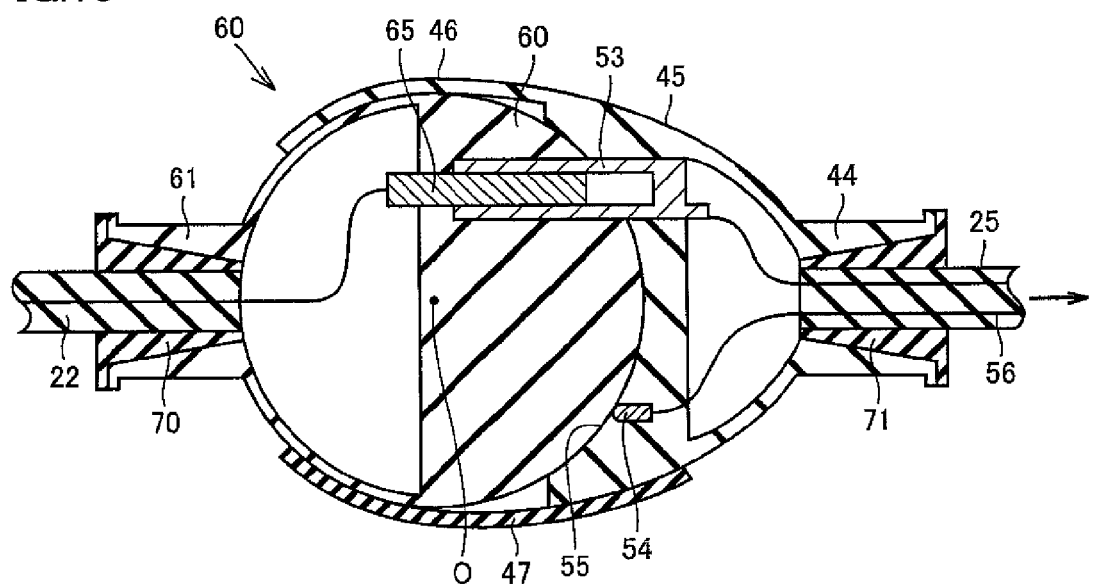
FIG. 10 is a cross section of connection device 40.

FIG. 10 is a cross section of connection device 40. As shown in FIG. 10, first cable 22 is connected to cylindrical portion 61, and each terminal such as terminal 65 is connected to a signal line, a power line and/or the like in first cable 22.

First cable 22 has proximal end 24 with a threaded portion, whereas cylindrical portion 61 has an internal circumferential surface threaded to serve as a female screw, and threaded portion 70 is screwed into the female screw. Threaded portion 70 and cylindrical portion 61 are thus detachably attachable.

As shown in FIG. 8, second connection member 42 includes a receiving portion 43 provided to encapsulate at least a portion of spherical portion 60 of first connection member 41, and a cylindrical portion 44 provided with receiving portion 43 and having second cable 25 connected thereto. Receiving portion 43 for first connection member 41 includes a base 45 having cylindrical portion 44 connected thereto, a plurality of pieces 46 and 47 provided at base 45, an engagement portion 49 engaging pieces 46 and 47 together, and a resilient member 48.

In FIG. 8 and FIG. 10, cylindrical portion 44 has an internal circumferential surface threaded to serve as a female screw, whereas second cable 25 has distal end 27 with a threaded portion 71, and cylindrical portion 44 receives threaded portion 71.

Base 45 includes a shaft 50 rotatably supporting piece 47, terminals 51, 52, 53 provided at a contact surface 55 that spherical portion 60 contacts, and a contact sensor 54 provided on contact surface 55. Shaft 50 is inserted in a hole 50a formed through piece 47.

As shown in FIG. 10, contact surface 55 is formed to have a curved surface extending along an external surface of spherical portion 60.

Terminals 51 and 52 are power terminals and connected to a power line in second cable 25. Terminal 53 is connected to a ground line, a signal line and/or the like provided in second cable 25, for example. Terminals 51-53 are formed cylindrically and adapted to be capable of receiving terminals 65, 66, 67 provided at first connection member 41.

Contact sensor 54 is connected to a signal line 56 provided in second cable 25, as shown in FIG. 10. Signal line 56 is connected to vehicular ECU 7 shown in FIG. 2.

Contact sensor 54 is adapted to be capable of sensing whether first connection member 41 and second connection member 42 are connected together. When first connection member 41 and second connection member 42 are connected together, contact sensor 54 contacts spherical portion 60. When contact sensor 54 no longer contacts spherical portion 60, contact sensor 54 transmits a signal to vehicular ECU 7. Vehicular ECU 7 receives the signal from contact sensor 54 and in response disconnects switching element 8 shown in FIG. 2.

Piece 46 is secured to base 45. Piece 46 is formed so as to project from base 45 and provided to cover terminals 51, 52, 53 provided at base 45. Piece 46 is formed to have a surface curved along an external surface of spherical portion 60. Piece 46 has an internal surface extending along an external surface of spherical portion 60 and having a projection 57 extending from a distal end of piece 46 to reach base 45.

When piece 46 is attached to an external surface of spherical portion 60, projection 57 fits in a slit 68 formed on spherical portion 60 and thus prevents spherical portion 60 from rotating.

Piece 46 has an edge provided with a tab 59. As shown in FIG. 10, piece 46 extends from base 45 along an external surface of spherical portion 60 beyond a center point O toward cylindrical portion 61.

As shown in FIG. 8, piece 47 has a joint having hole 50a receiving shaft 50, and piece 47 is provided to be pivotable relative to base 45. Piece 47 has an external circumferential surface having a groove 58 to engage with tab 59. Tab 59 and groove 58 are adapted to be capable of engaging with each other, and engagement portion 49 includes tab 59 and groove 58, and when tab 59 is engaged with groove 58, piece 46 and piece 47 are coupled together.

Piece 47 is also formed to have a surface curved to extend along an external surface of spherical portion 60. When first connection member 41 and second connection member 42 are connected together, piece 47 extends from a circumferential surface of base 45 along spherical portion 60 beyond center point O toward cylindrical portion 61, as shown in FIG. 10.

Accordingly, when spherical portion 60 has a surface such that a portion thereof that has cylindrical portion 61 connected thereto is a distal end of spherical portion 60 for the sake of illustration, contact surface 55, piece 46, and piece 47 cooperate with each other to cover a surface of spherical portion 60 at a portion extending from a proximal end of spherical portion 60 beyond center point O toward cylindrical portion 61.

Spherical portion 60 is increased in thickness as seen at its proximal end toward center point O and decreased in thickness as seen at center point O toward its distal end.

Accordingly, when piece 46 and piece 47 are engaged together, receiving portion 43 engages with spherical portion 60, and first connection member 41 and second connection member 42 are coupled together.

Then, when spherical portion 60 and receiving portion 43 are pulled away from each other, piece 46 and piece 47 receive force from the external surface of spherical portion 60 and are thus pushed away from each other.

When spherical portion 60 and receiving portion 43 experience tension equal to or larger than prescribed tension, tab 59 and groove 58 are disengaged and receiving portion 43 and spherical portion 60 are disengaged.

Note that while the present embodiment has been described for an example with spherical portion 60, spherical portion 60 may be provided in the form of a rugby ball.

Resilient member 48 is provided at a circumference of shaft 50 and biases piece 47 away from piece 46.

As has been set forth above, once tab 59 and groove 58 have been disengaged, the biasing force of resilient member 48 moves piece 47 away from piece 46.

Figure 11:
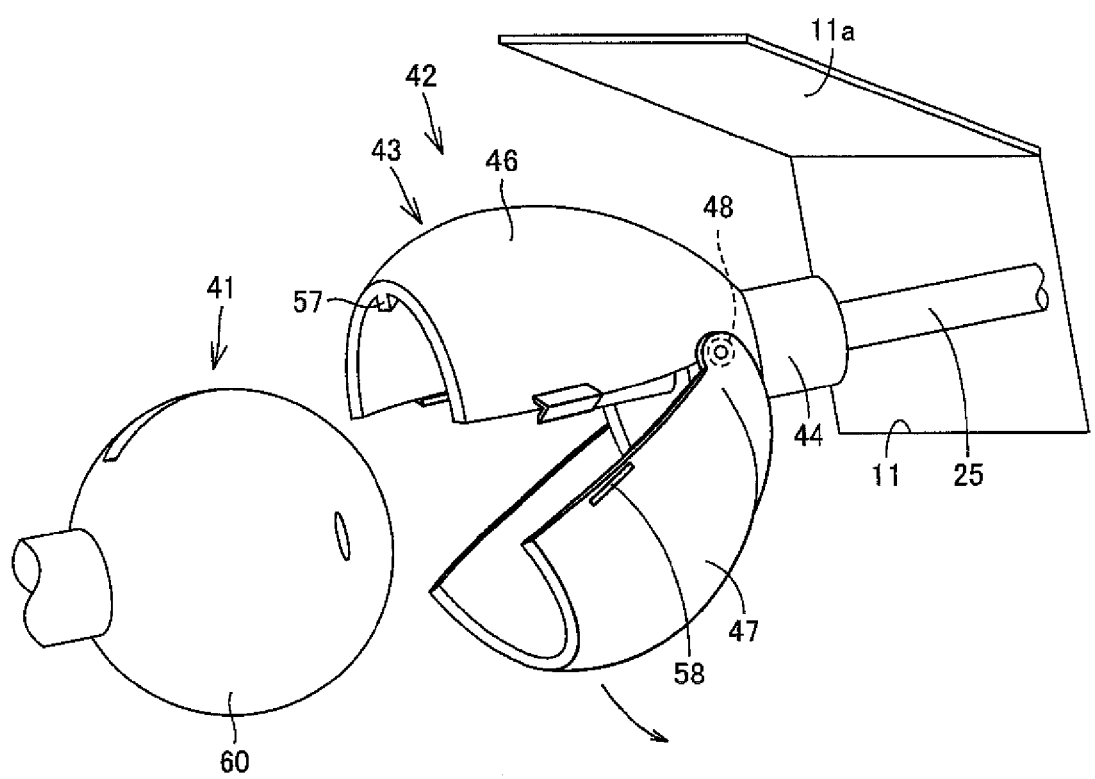
FIG. 11 is a perspective view of a first connection member 41 and a second connection member 42 with pieces 46 and 47 disengaged.
Figure 12:
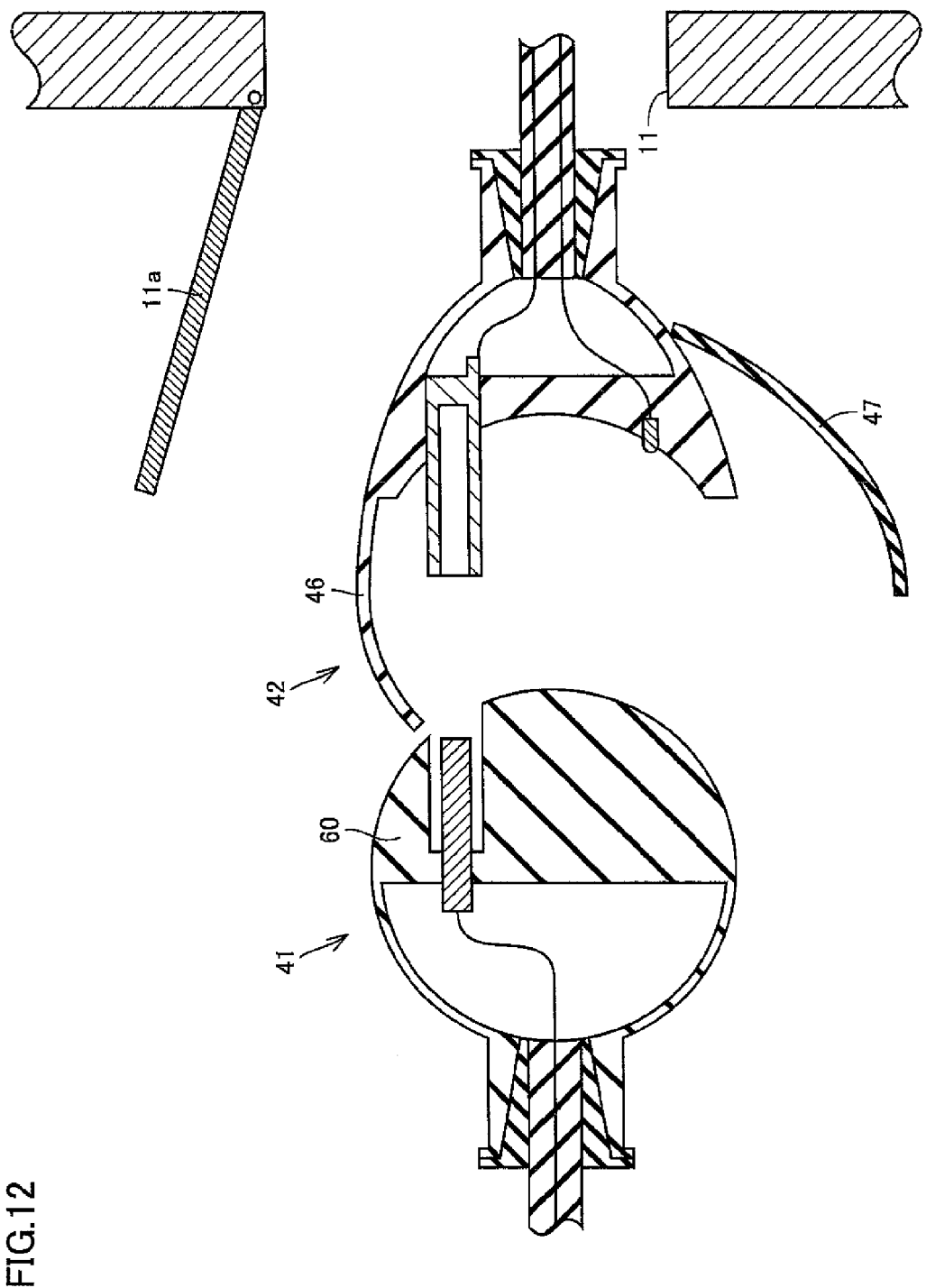
FIG. 12 is a cross section of connection device 40 with pieces 46 and 47 disengaged.

FIG. 11 is a perspective view of first connection member 41 and second connection member 42 with pieces 46 and 47 disengaged, and FIG. 12 is a cross section of connection device 40 with pieces 46 and 47 disengaged.

As shown in FIG. 11 and FIG. 12, when tension equal to or larger than prescribed tension is exerted between first connection member 41 and second connection member 42 and tab 59 and groove 58 are disengaged, receiving portion 43 opens and spherical portion 60 comes off receiving portion 43.

Furthermore, the biasing force of resilient member 48 keeps piece 47 away from piece 46 and thus holds receiving portion 43 open.

Receiving portion 43 in the open position has a width larger than that of the opening of cable port 11, and the opening of cable port 11 has an edge that can catch receiving portion 43 in the open position.

This prevents second connection member 42 in the open position from entering vehicle 10 past cable port 11.

Thus, while first connection member 41 and second connection member 42 have been disengaged, receiving portion 43 is prevented from entering vehicle 10, and first connection member 41 and second connection member 42 can be easily re-coupled together.

Specifically, piece 46 and piece 47 can be attached to a circumferential surface of spherical portion 60 that has come off and tab 59 engaged with groove 58 to re-couple first connection member 41 and second connection member 42 together.

Thus when vehicle-mounted cable 20 for example with plug 21 connected to power supply 17 has first cable 22 caught by an object, connection device 40 can be decoupled to minimize/prevent excessive load otherwise exerted to those portions of second cable 25 and vehicle 10 that are connected together.

Furthermore when vehicle-mounted cable 20 has first cable 22 caught by an object and second cable 25 tensioned, connection device 40 is externally pulled out from cable port 11.

As such, when first connection member 41 and second connection member 42 are disconnected and receiving portion 43 opens, receiving portion 43 is located outside vehicle 10, and first connection member 41 and second connection member 42 can subsequently be easily coupled together.

Furthermore, once first connection member 41 and second connection member 42 have been disconnected, vehicular ECU 7 operates in response to a signal received from contact sensor 54 to disconnect switching element 8 shown in FIG. 2, which can prevent terminals 51, 52, 53 from being externally exposed with voltage applied thereto.

Piece 46 is provided such that it covers terminals 51, 52, 53 provided at base 45, and when first connection member 41 and second connection member 42 are disconnected, piece 46 can function as a protective cover to protect terminals 51, 52, 53 from damage.

If first connection member 41 and second connection member 42 should be damaged, threaded portions 70 and 71 can be removed from cylindrical portions 61 and 44 to facilitate replacing first connection member 41 and second connection member 42.

Figure 13:
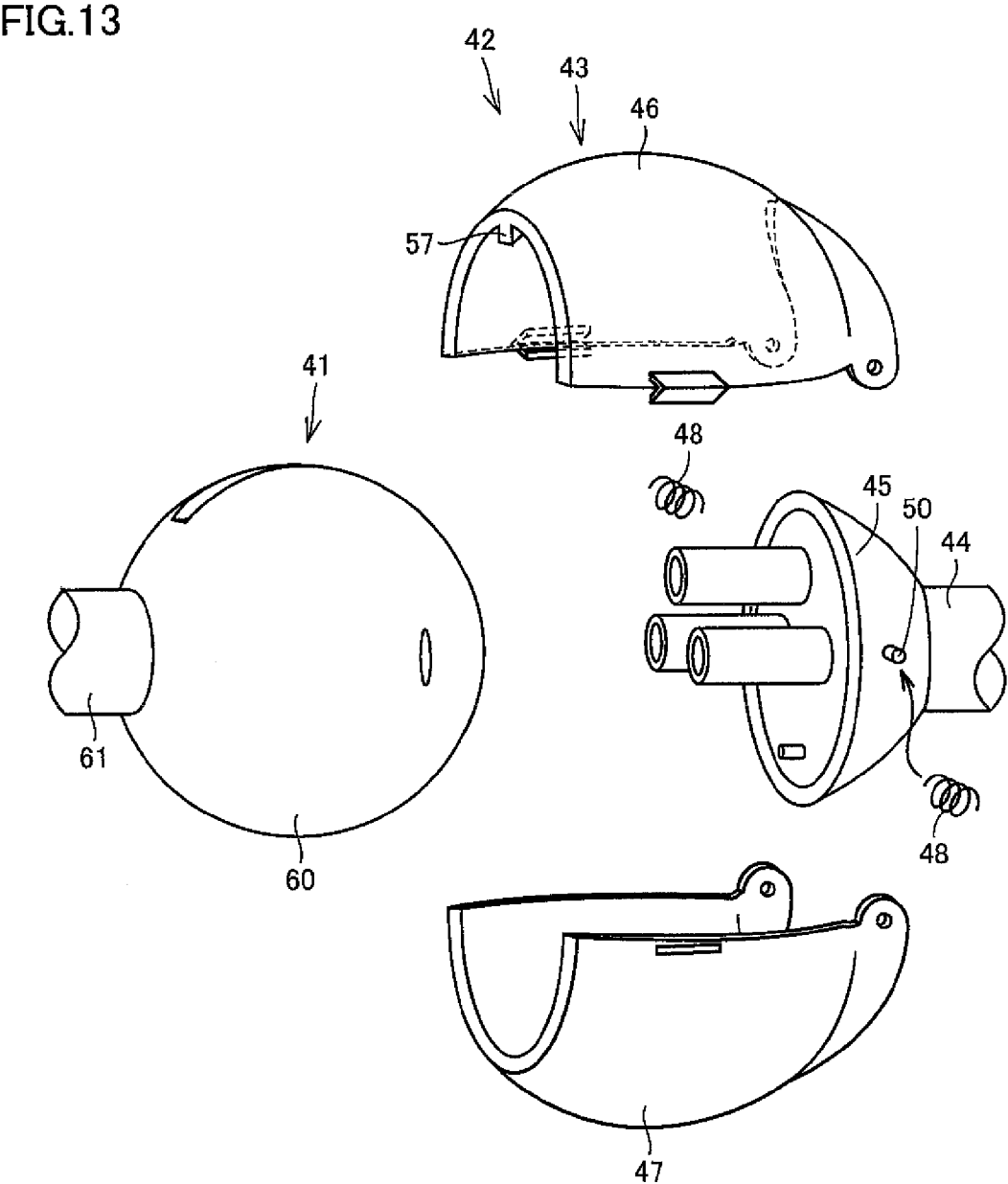
FIG. 13 is a perspective view of vehicle-mounted cable 20 in an exemplary variation.

Note that while vehicle-mounted cable 20 shown in FIG. 7 to FIG. 12 has been described for an example with piece 46 secured to base 45, piece 46 and piece 47 may be pivotable about base 45, as shown in FIG. 13 or the like.

In the FIG. 13 example, piece 46 is also rotatably supported by shaft 50, and resilient member 48 biases piece 46 and piece 47 so that piece 46 and piece 47 mutually open.

Figure 14:
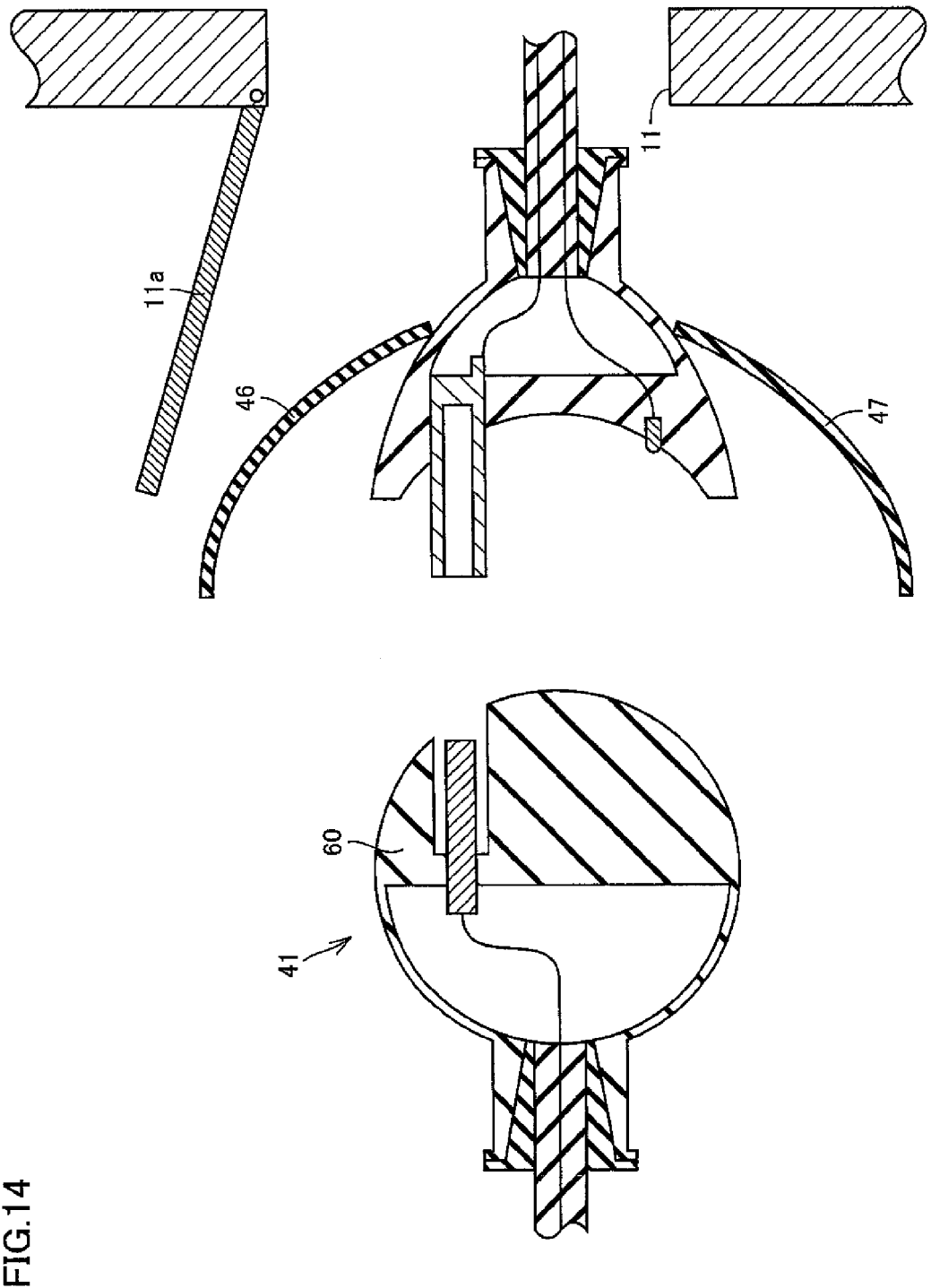
FIG. 14 is a cross section of connection device 40 of vehicle-mounted cable 20 shown in FIG. 13, as seen when connection device 40 is disconnected.

FIG. 14 is a cross section of connection device 40 of vehicle-mounted cable 20 shown in FIG. 13, as seen when connection device 40 is disconnected.

As shown in FIG. 14, when first connection member 41 and second connection member 42 are disconnected, piece 46 and piece 47 both open. Piece 46 and piece 47 that both open ensure that receiving portion 43 can be prevented from entering vehicle 10 past cable port 11.

While the present invention has been described in embodiments as above, it should be understood that the embodiments disclosed herein are illustrative and non-restrictive in any respect. The scope of the present invention is defined by the terms of the claims, and is intended to include any modifications within the scope and meaning equivalent to the terms of the claims. Furthermore, the above numerical values and the like are illustrative and are not limited to the above numerical values and ranges.

INDUSTRIAL APPLICABILITY

The present invention is applicable to vehicle-mounted cables and vehicles.

REFERENCE SIGNS LIST

1: engine; 2: power split device; 3: front wheel; 4: converter; 5: inverter; 6: inverter; 8: switching element; 9: converter; 10: vehicle; 10a: body; 11: cable port; 11a: lid; 12: back side; 13: fuel port; 14: lateral side; 17: power supply; 19: electric conduction cable; 20: vehicle-mounted cable; 21: plug; 22: first cable; 23, 27: distal end; 24, 26: proximal end; 25: second cable; 30: cable accommodation device; 31: bobbin; 32: support plate; 33: rotating shaft; 34: power line; 35: plug housing portion; 40: connection device; 41: first connection member; 42: second connection member; 43: receiving portion; 44, 61: cylindrical portion; 45: base; 46, 47: piece; 48: resilient member; 49: engagement portion; 50: shaft; 50a, 62, 63, 64: hole; 51, 52, 53, 65, 66, 67: terminal; 54: contact sensor; 55: contact surface; 56: signal line; 57: projection; 58: groove; 59: tab; 60: spherical portion; 68: slit; 70, 70, 71, 71: threaded portion; B: battery; C: capacitor; FT: fuel tank; L: reactor; MG1, MG2: motor generator; O: center point; R: direction of rotation.

The invention claimed is:

1. A vehicle-mounted cable mounted in a vehicle provided with a cable port, comprising:
   a first cable that can be pulled out through said cable port;
   a second cable connected to said vehicle; and
   a connection device that connects said first cable and said second cable together, and disconnects said first cable and said second cable when said connection device experiences tension equal to or larger than prescribed tension, said connection device being provided at a position allowing said connection device to be exposed outside said vehicle through said cable port when said first cable is fully pulled out from a cable accommodation device.

2. The vehicle-mounted cable according to claim 1, wherein when said connection device is pulled out through said cable port, an end of said second cable connected to said vehicle is tensioned.

3. The vehicle-mounted cable according to claim 1, wherein:
   said connection device includes a first connection member associated with said first cable and a second connection member associated with said second cable and capable of engaging with said first connection member;
   said second connection member includes a receiving portion provided to cover at least a portion of said first connection member;
   when tension equal to or larger than prescribed tension is exerted between said first connection member and said second connection member, said receiving portion deforms to be open so as to disconnect said first connection member and said second connection member; and
   said cable port has an opening having an edge that catches said receiving portion in an open position and prevents said receiving portion in said open position from entering said vehicle past said cable port.

4. The vehicle-mounted cable according to claim 3, wherein:
   said receiving portion includes a base, a first piece provided at said base and attached to an external circumferential surface of said first connection member, a second piece provided at said base and movable away from said first piece, a biasing member biasing said first piece and said second piece to cause said first piece and said second piece to straddle wide therebetween, and an engagement portion engaging said first piece and said second piece together; and
   said engagement portion disengages when said first connection member and said second connection member experience tension equal to or larger than prescribed tension.

5. The vehicle-mounted cable according to claim 4, wherein:
   said first connection member includes a spherical portion; and said first piece and said second piece are formed to have a surface curved to cover said spherical portion.

6. The vehicle-mounted cable according to claim 4, wherein:
said base is provided with a terminal; and
said first piece is secured to said base.

7. A vehicle comprising:
a vehicle-mounted cable according to claim 1.

* * * * *